(12) United States Patent
Yoshihara

(10) Patent No.: US 6,437,022 B1
(45) Date of Patent: Aug. 20, 2002

(54) COMPOSITION FOR MOLDING BIODEGRADABLE PLASTIC, BIODEGRADABLE PLASTIC OBTAINED THEREFROM, METHOD OF MOLDING THE SAME, AND USE OF BIODEGRADABLE PLASTIC

(76) Inventor: Toshinobu Yoshihara, 3-20-24, Hanaguri, Souka-shi, Saitama 340-0044 (JP)

( * ) Notice: Subject to any disclaimer, the term of this patent is extended or adjusted under 35 U.S.C. 154(b) by 0 days.

(21) Appl. No.: 09/762,495
(22) PCT Filed: Aug. 5, 1999
(86) PCT No.: PCT/JP99/04228
§ 371 (c)(1),
(2), (4) Date: May 4, 2001
(87) PCT Pub. No.: WO00/09609
PCT Pub. Date: Feb. 24, 2000

(30) Foreign Application Priority Data

Aug. 11, 1998 (JP) .......................................... 10-226393

(51) Int. Cl.⁷ .................................................. C08K 5/00
(52) U.S. Cl. ...................................................... 523/128
(58) Field of Search .......................................... 523/128

(56) References Cited

U.S. PATENT DOCUMENTS 5,254,607 A * 10/1993 McBride ...................... 524/52
5,417,679 A * 5/1995 Toms .......................... 604/370
5,422,387 A * 6/1995 Toms .......................... 524/52
5,861,461 A * 1/1999 Lee .......................... 525/54.26
6,277,899 B1 * 8/2001 Bastiolli ...................... 523/128

FOREIGN PATENT DOCUMENTS

| JP | 3-24101 | 2/1991 |
| JP | 3-31333 | 2/1991 |
| JP | 4-500834 | 2/1992 |
| JP | 4-501136 | 2/1992 |
| JP | 6-49276 | 2/1994 |
| JP | 6-5088868 | 10/1994 |
| JP | 8-59892 | 3/1996 |
| JP | 8-502308 | 3/1996 |
| JP | 8-502552 | 3/1996 |
| JP | 8-283458 | 10/1996 |
| JP | 9-255880 | 9/1997 |
| JP | 9-286870 | 11/1997 |
| JP | 10-101943 | 4/1998 |

* cited by examiner

*Primary Examiner*—Paul R. Michl
(74) *Attorney, Agent, or Firm*—Merchant & Gould P.C.

(57) ABSTRACT

A composition for molding a biodegradable plastic comprises 100 parts by weight of (A) a biodegradable component comprising an aliphatic polyester as a main ingredient; and preferably 5 to 55 parts by weight of (B) a biodegradable component comprising a starch material containing a destructured starch as a main ingredient. The composition can be subjected to secondary processings such as cutting and bonding and can be molded into a biodegradable sheet having a desired rigidity.

13 Claims, 5 Drawing Sheets

FIG. 4A
FIG. 4B
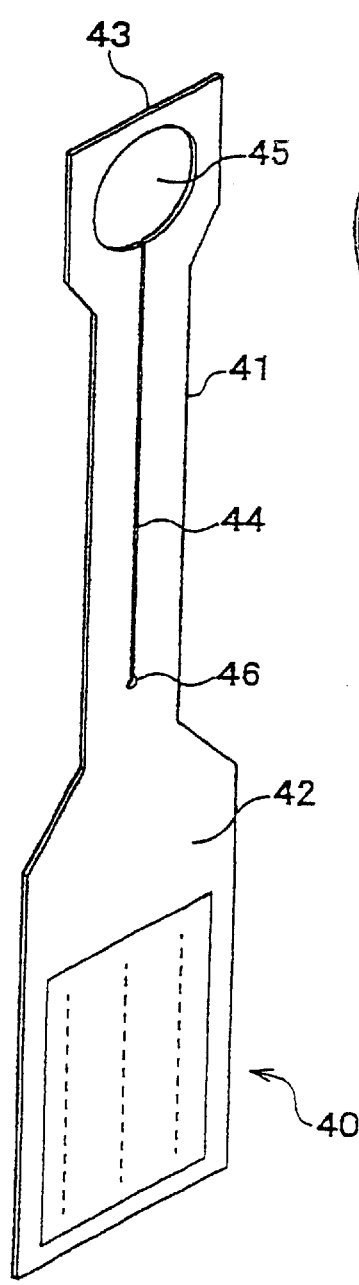
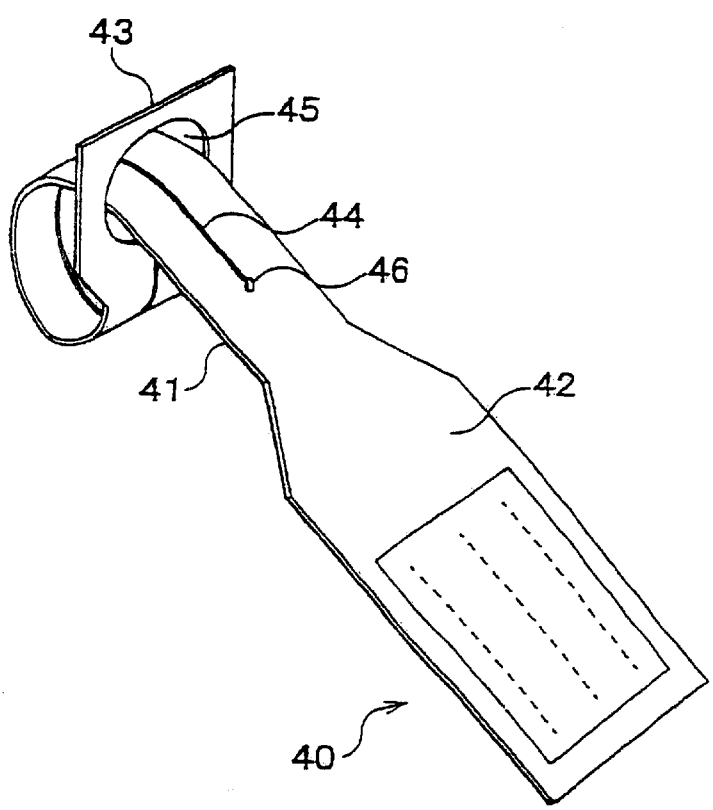

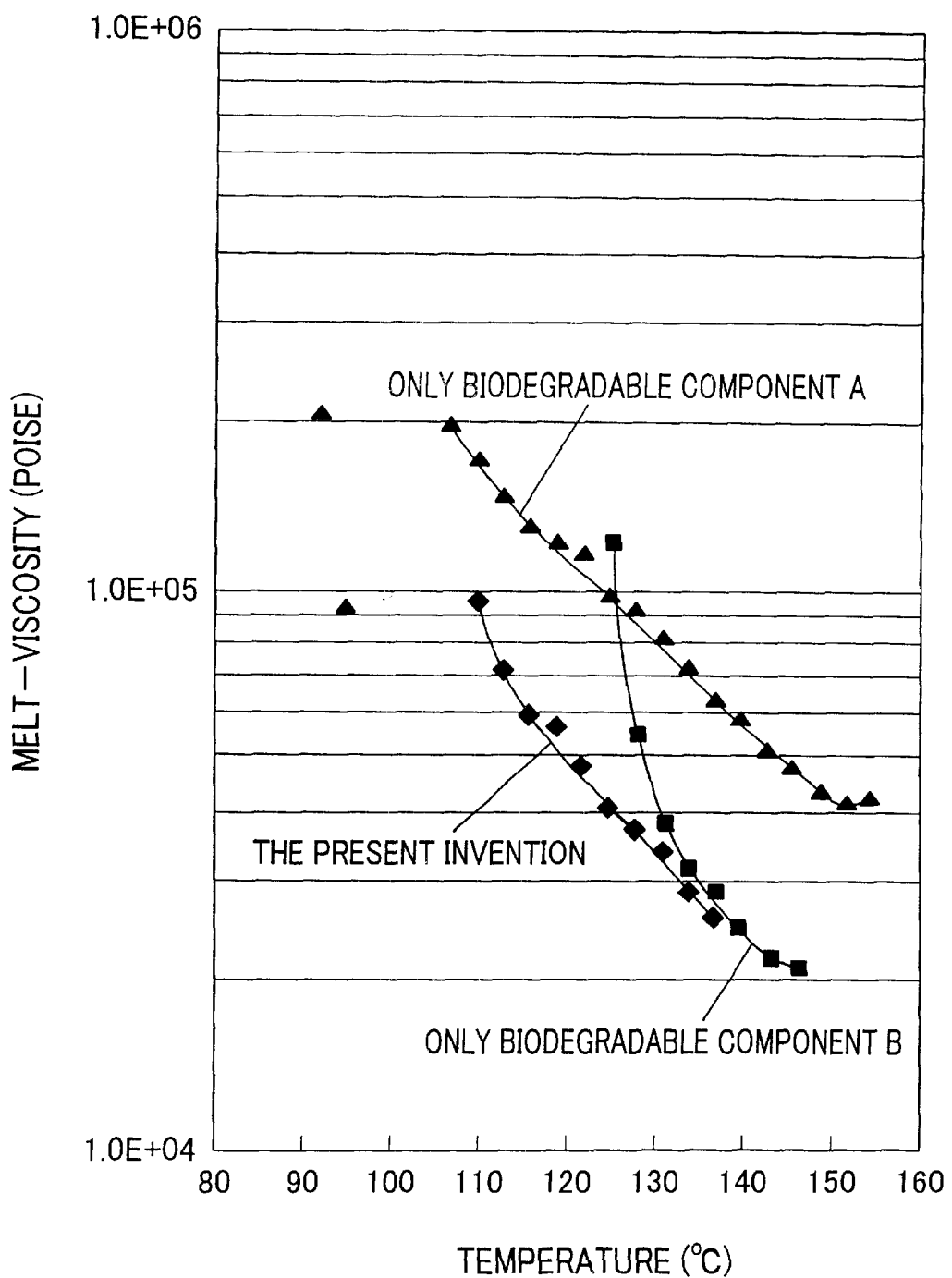

COMPOSITION FOR MOLDING BIODEGRADABLE PLASTIC, BIODEGRADABLE PLASTIC OBTAINED THEREFROM, METHOD OF MOLDING THE SAME, AND USE OF BIODEGRADABLE PLASTIC

FIELD OF THE INVENTION

The present invention relates to a composition for molding a biodegradable plastic, a biodegradable plastic product from the composition, and particularly to a biodegradable sheet and a method of the production thereof, and use of the biodegradable sheet

BACKGROUND ARTS

In recent years, biodegradable plastics have considerable attention, which have functions similar to those of general plastics during its use, and which are degraded into compounds each having a relatively low molecular weight, and are finally decomosed into gaseous carbon dioxide and water due to the functions of microorganism existing in the natural kingdom; thus, various kinds of biodegradable plastics have been developed.

Such biodegradable plastics are roughly classified into microorganism product type plastics obtained from aliphatic polyesters produced by microorganisms; plastics originated from natural macromolecules such as starches and cellulose acetates (see, for example, Japanese Patent Laid open publication Nos. H3-24101, H3-31333, H4-500834, H4-501136, and H8-59892); and plastics produced from chemically synthetic raw materials including polylactic acid (polylactate), polypcyrensaxenate, and polycaproracton etc (see, for example, Japanese Patent Laid open publication No. H9-31176).

Specifically, as described in Japanese Patent Laid open publication Nos. H3-24101, H3-31333, H4-500834, H4-501136, and H8 -59892, raw materials for biodegradable plastics have been known comprising 45% by weight of destructured starch, which is a naturally originating macromolecular material, 15% by weight of pure glycerol, 20% by weight of low density polyethylene, 15% by weight of an ethylene-acrylic acid (acrylate) copolymer, 5% by weight of calcium carbonate, and the like for the production of biodegradable plastics.

Such raw materials are formed, for example, into a film, which is then used in a garbage baggage. In the formation of the biodegradable plastic into a sheet, any of a T-die method, a calendaring method and an inflation method has been used as a rule.

The T-die method is a method suitable for the formation of a sheet having a wide variety of thickness from a thin sheet to a thick sheet in a large scale, whilst the calendaring method is a method suitable for producing a large amount of a thin sheet. The calendaring process is suitable for producing a wide variety of sheets having a various thickness from a thin sheet to a thick sheet in a small amount.

Consequently, any of the methods is selected depending upon the objects and applications of the final product and the number of the product to be produced.

However, the conventional biodegradable plastics have be of the following problems: In producing a sheet utilizing any of the conventional biodegradable plastics, such as the naturally occurring macromolecular, microorganisms originating, or chemically synthesized biodegradable plastics, with a conventional inflation film forming installation, it is difficult to produce a sheet in a stable manner because of the problems associated with the material itself and with the film for ability during the course of melting the material. Even if the conventional calendaring apparatus is used, due to decrease in the viscosity during the course of melting the material and poor separation from rolls, it is difficult to be formed into a sheet having a desired thickness In the T-die method, due to a narrow temperature range for the film forming, it is difficult to be formed into a sheet having a given thickness in a stable manner.

If the biodegradable plastics can be formed into a sheet having a desired thickness, the application of the biodegradable plastics can be proven to extend much more.

Also, the development of a biodegradable plastic has been strongly desired, which is applicable to all of the film forming methods.

SUMMARY OF THE INVENTION

An object of the present invention is, therefore, to provide a composition for molding a biodegradable plastic, which is applicable to all of the T-die method, calendaring method, inflation method and the like to provide a suitable biodegradable plastic product, particularly a biodegradable plastic sheet.

Another object of the present Invention is to provide a method for producing a biodegradable plastic product obtained from the composition for molding a biodegradable plastic just mentioned.

Still another object of the present invention is to provide novel applications of the biodegradable sheet.

We have made serious studies and investigation to discover that these objects can be attained if a blend of biodegradable components each having different characteristics is used. As a result, the present invention has been accomplished.

The present invention concerns a composition for molding a biodegradable plastic comprising:

A) a biodegradable component comprising an aliphatic polyester as a main ingredient; and B) a biodegradable component comprising a starch material containing a destructured starch as a main ingredient.

In the composition for molding a biodegradable plastic, the content of biodegradable component (B) is preferably from 5 to 55 parts by weight based on 100 parts by weight of biodegradable component (A).

Furthermore, in the composition for molding a biodegradable plastic, biodegradable component (B) preferably comprises from 45 to 55% by weight of the biodegradable components, from 12 to 15% by weight of a plasticizer having a high boiling point as an additive and from 1 to 3% by weight of a stabilizer as an additive, and the rest of ethylene-vinyl alcohol copolymer.

Moreover, biodegradable component (A) is preferably an aliphatic polyester represented by the formula:

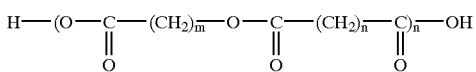

wherein m and are independently an integer.

In addition, the composition for molding a biodegradable plastic may contain a biodegradable pigment as an additive.

The present invention is also relates to a biodegradable molded product obtained by forming the composition for molding a biodegradable plastic just mentioned, a biodegradable sheet obtained by forming the composition for molding a biodegradable plastic just mentioned into a sheet.

The biodegradable sheet preferably has a thickness of from 0.05 to 1 mm.

Also, the biodegradable sheet can be formed into a cover product through second or multi-step forming including cutting and conjunction step.

Moreover, the biodegradable sheet can be configured to be an advertisement display body by providing an adhesive layer on one layer, providing an advertisement display portion on another layer, and having through holes provided on the whole surface of the sheet. In this case, the advertisement display body is preferably adhered on a mobile vehicle having windows at the adhesive layer side.

BRIEF DESCRIPTION OF THE DRAWINGS

FIG. 4 is a view showing an example in which the composition for molding a biodegradable plastic of the present invention is molded on tag sheet, wherein FIG. 4(a) shows an unused state, and FIG. 4(b) shows a used state.

FIG. 5 is a graph showing a relation between the temperature and the melt-viscosity of the material for molding biodegradable plastic of the present invention and a comparative material for molding biodegradable plastic.

BEST MODE FOR CARRYING OUT THE INVENTION

Figure 1A:
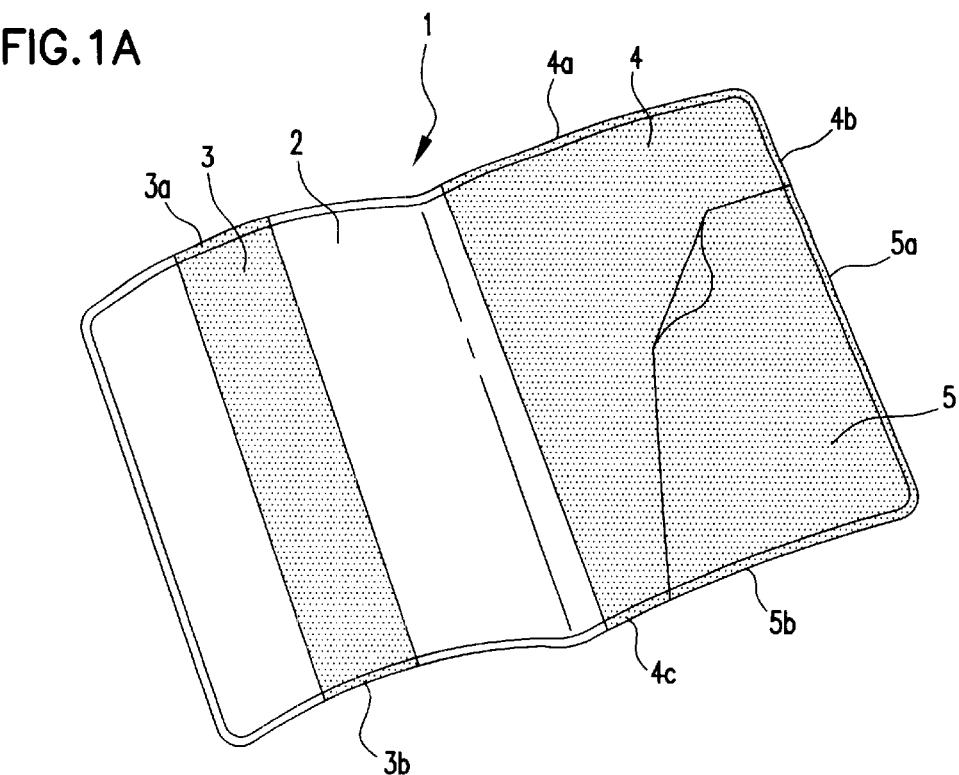
FIGS. 1(a) and (b) are perspective views each showing an example in which the composition for molding a biodegradable plastic of the present invention is used to form a passport cover, which is a cover product.

The present invention will now be described in detail.
[Composition for Molding]

The first aspect of the present invention concerns a composition for molding a biodegradable plastic comprising: (A) a biodegradable component comprising an aliphatic polyester as a main ingredient; and (B) a biodegradable component comprising a starch material containing a destructured starch as a main ingredient.
(Biodegradable Component (A))

In the present invention, the aliphatic polyester used as biodegradable component (A) is an aliphatic polyester which exhibits biodegradability alone and is composed of a polyol ingredient and an aliphatic carboxylic acid ingredient. Such biodegradable component (A) is described in Japanese Patent Laid-Open No 9-31176. Also, it is commercially available from Showa Denko Kabushiki Kaisha under the trade name of "Bionolle".

Glycols are preferred as the polyol ingredient. Main ingredient of the glycol ingredient is 1,4-butane diol and a part of the glycol ingredient should be an alpha-glycol represented by the following formula:

wherein R is methyl or ethyl group.

Typical examples of the alpha-glycols include propylene glycol, and 1,2-butane diol. The alpha-glycol can be used in a proportion of from 1 to 30 mol %, and preferably from 1 to 20 mol %, in the glycol ingredient. In the case where, the alpha-glycol is 1,2-butane diol, it is preferably from 1 to 20 mol %. If the amount of the alpha-glycol is lower than the lower limit, no additive effect can be exhibited, and conversely, if it exceeds the upper limit, the melting point is sharply decreased. Accordingly, the deviation from the above range is of disadvantage.

A typical example of aliphatic dicarboxylic acid (or anhydride thereof) is succinic acid (or anhydride), but any other dicarboxylic acid can be used in conjunction as long as the resulting aliphatic polyester has a melting point not lower than 70° C. Examples include adipic acid, pimmelic acid, sebacic acid, and dodecanoic dicarboxylic acid. The proportion of the aliphatic dicarboxylic acid, which is jointly used, depends upon the amount of the alpha-glycol, and is generally from 1 to 30 mol %, and preferably from approximately 2 to 10 mol %, based on the total aliphatic dicarboxylic acid. Succinic acid can be used in a proportion of from 70 to 99 mol %, and preferably from 90 to 98 mol %, in the total aliphatic dicarboxylic acid (or anhydride thereof) Also, the aliphatic dicarboxylic acid (or anhydride thereof) may totally be made up of succinic acid, i.e., 100 mol % of succinic acid.

The joint use of any other aliphatic dicarboxylic with succinic acid is mainly for the purpose of improving the biodegradability of the aliphatic polyester, as well as for imparting the flexibility to the aliphatic polyester, and for controlling the melting point (proccessability) and the biodegradability of the aliphatic polyester in a well-balanced manner. If the amount of the aliphatic dicarboxylic acid other than succinic acid exceeds 30 mol % relative to the total amount of the aliphatic dicarboxylic acid (or anhydride), the melting point is decreased, resulting in poor proccessability. In this case, the biodegradability and the proccessability cannot be well-balanced The glycol ingredient and the aliphatic dicarboxylic acid (or anhydride) ingredient may be formulated in any desired proportion, and the proportion thereof should not be restricted.

In the polycondensation between the polyol and the dicarboxylic acid, at least one polyfunctional component selected from group consisting of tri- or polyhydric alcohols, tri- or polybasic carboxylic acids (or anhydrides), and tri- or polybasic oxycarboxylic acids (or anhydrides) may optionally be used in conjugation within the range that the object of the present invention is not impaired. In this case, for example, branched chains are introduced into biodegradable component (A) to widen the distribution of the molecular weight, resulting in the diversified properties.

Examples of tri- or polyhydric alcohols include glyceride, trimethylol propane, pentaerythritol, ethylene oxide adducts of triallylisocyanurate and the like. Glycidol which is a dehydrated monoexpoxy compound may also be used. As the tri- or polybasic carboxylic acids (or anhydrides), malic acid (or anhydride), tartaric acid, or citric acid may advantageously be utilized.

Examples of the tri- or polybasic oxycarboxylic acids (or anhydrides) include trimesic acid, propane tricarboxylic acid, trimellitic anhydride, pyromellitic hydride, benzophenone tetracarboxylic anhydride, cyclopentanetetracarboxylic anhydride, and the like, with the use of trimellitic anhydride and pyromellitic anhydride being particularly advantageous These polyfunctional components may be used as a mixture as occasion demands. The total amount of the polyfunctional components is from 0.1 to 5 mol % relative to 100 mol % of the total of the aliphatic dicarboxylic acid(s)

(or anhydride(s)), and they can be used at the initiation of the polycondensation. The amount of the polyfunctional component less than 0.1 mol % has no influence upon the reaction. Conversely, if the amount exceeds 5 mol %, the possibility of the gelation during the course of the reaction is unduly increased.

The aliphatic polyester obtained from the polycondensation has, for example, the following construction:

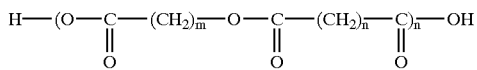

(Biodegradable Component (B))

In the present invention, a biodegradable component comprising a starch material containing a destructured starch as a main ingredient is used as biodegradable component (B). However, such biodegradable component (B) is difficult to control its melt-viscosity, for example, as shown in FIG. 5, and thus, it is assumed to be a component to be formed into sheet if it is used singly.

Examples of biodegradable components (B) which can be used, include those which disclose the composition for molding a biodegradable plastic containing a destructured starch. The sources of biodegradable plastic (B), which can be used, are, for example, "mater-bi" available from Nippon Gosei Kagaku Kabushiki Kaisha, "NOVON" from Nissho Kabushiki Kaisha, "Bioplast" from Bioteck Co., Ltd., and "Ever Corn" from Nippon Corn Starch Co., Ltd The destructured starches which can be used are naturally originating starch in general, and corn starch, potato starch, tapioca starch, rice starch, wheat starch, broad beam starch, high amylose-containing starch, preferably having an amylose content of not less than 30% by weight, and waxy starch.

In addition, physically or chemically modified starches such as ethoxylated starches, oxypropylated starches, starch acetates, starch butyrates, starch propionates, and cathionized starches, each having a substitution degree of from 0.1 to 2, oxidized starches, crosslinked starches, gelatinized starches and complicated starches having a polymer construction with a character at the band of 947 $cm^{-1}$ as analyzed by a secondary derivative FTIR (Fourier transform Infrared Analysis) may be partially utilized.

These starch materials can be processed in an extruder or any other apparatus which can maintain the temperature. The processing is carried out in the presence of water and/or a plasticizer at a temperature of from 80 to 210° C. under the sharing conditions which makes the materials thermoplastic to convert the materials into thermoplastic states Preferably, the processing temperature is in the range of from 130° C. to 160° C.

The term "destructured" starch intended herein means a starch, which has undergone endothermic transformation due to a heat treatment at a high temperature whereby the molecule thereof is disordered.

The proportion of biodegradable component (B) is suitably selected within the range of from 5 to 55 parts by weight, based on 100 parts by weight of biodegradable component (A) to meet the object of the application. Specifically, if the amount of biodegradable component (B) to be added is less than 5 parts by weight, the effect of the addition of biodegradable component (B), i.e., the flexibility of the resulting molded product, is unduly decreased. Conversely, if it exceeds 55 parts by weight, the melt-viscosity is sharply decreased, resulting in poor processability and, at the same time, decreasing water resistance. A preferred range of biodegradable component (B) is from 15 to 30% by weight based on 100 parts by weight of biodegradable component (A).

Usually, the starch material is preferably used in the form of a pellet or granules to which a plasticizer having a high boiling point, a stabilizer, a binder component, and the like are added as additives from the viewpoint of the moldability. Specifically, preference is given to use a pellet or granules containing from 45 to 55% by weight of the biodegradable ingredient comprising the starch material containing the destructured starch as a main ingredient, from 1 to 3% by weight of a stabilizer, and the rest of ethylene-polyvinyl alcohol copolymer.

The additives to which biodegradable component (B) are as described in the patent publications mentioned previously and have been well known. So, the detail of the additives are omitted.

(Additives)

To biodegradable component (A), biodegradable component (B), or a mixture thereof may be added a pigment (preferably a biodegradable pigment), a fire retardant, a repellent for rodent within the range not impairing the range of the present invention.

The fire retardant includes compounds derived from phosphor-, sulfur- or halogen-containing compounds, which can be used singly or in combination of two or more thereof. Typical examples include, but are not restricted to, triphenyl phosphate, tributyl phosphate, tricresyl phosphate, tributhoxyphenyl phosphate, melamine pyrophosphate, ammonium polyphosphate, ethylenediamine, guanidium phosphate, tetrabromophthalic anhydride, halogenated paraffins, oxydiphenyl having a weide variety of bromation, ammonium sulfate and ammonium sulfamate, and they are applicable to a desired object. Also, aluminum hydroxide, antimony oxide, ammonium perborate, ammonium octamolybdate and the like can be used.

The repellent for rodent may be used in combination with a stabilizer, a nucleating agent or a fire retardant. Examples of the repellents which can be used are N,N-diethyl-m-triamide, diethylphenylacetamide, 2-decanal, ammonium chloride, potassium chlorate, terpenoid, cycloheximide, diguanidinoazaheptadecane, similar substances.

The fire retardant and the repellent for rodent are used in such an amount that the total amount of them plus other additives such as antioxidant and a UV stabilizer is within the range of from 1 to 5% by weight.

(Biodegradable Molded Product)

The composition for molding biodegradable plastic according to the present invention thus obtained is suitable for molding various molded products, particularly suitable for forming a sheet.

Typical biodegradable sheets of the present invention will now be described.

Figure 2:
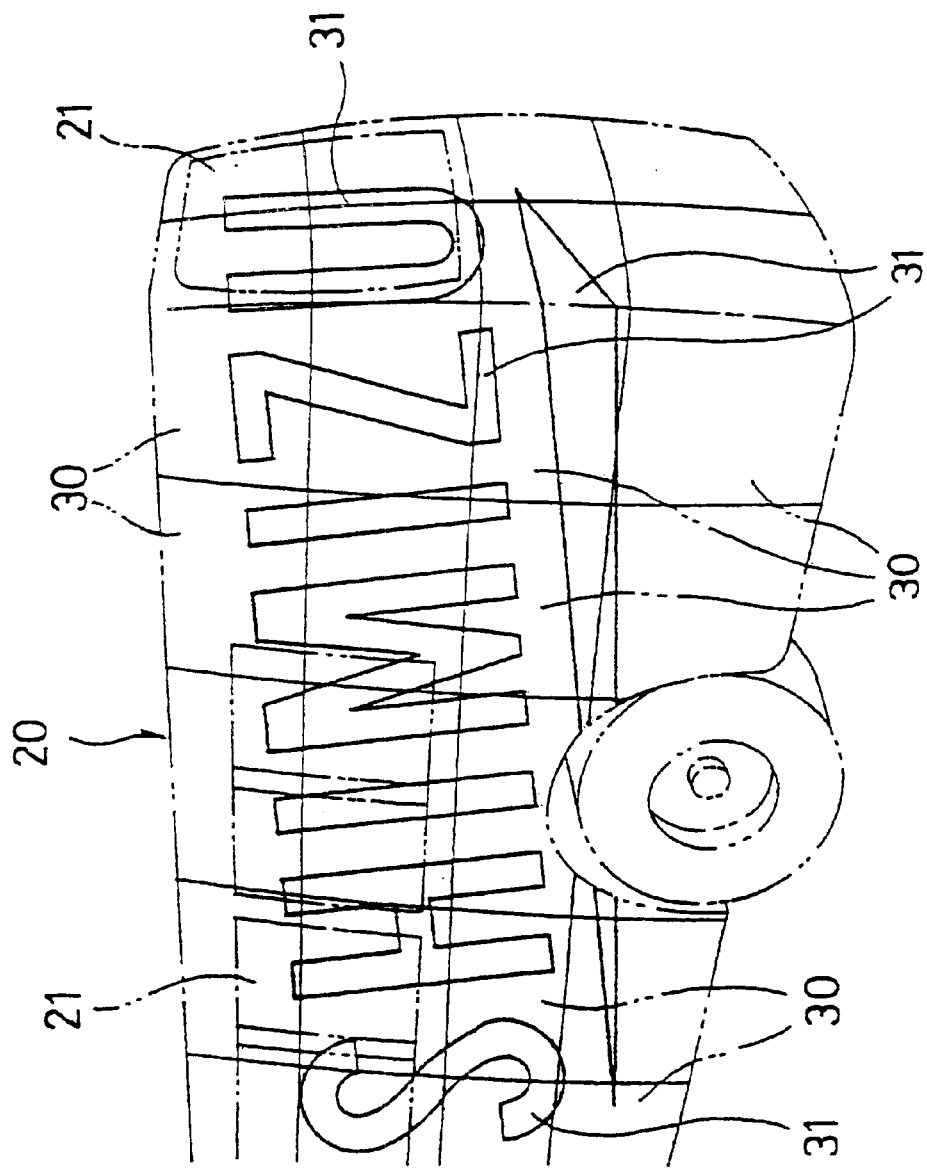
FIG. 2 is a perspective view showing an example in which the composition for molding a biodegradable plastic of the present invention is formed into a sheet, which is adhered onto a mobile vehicle as an advertisement display body.
Figure 3:
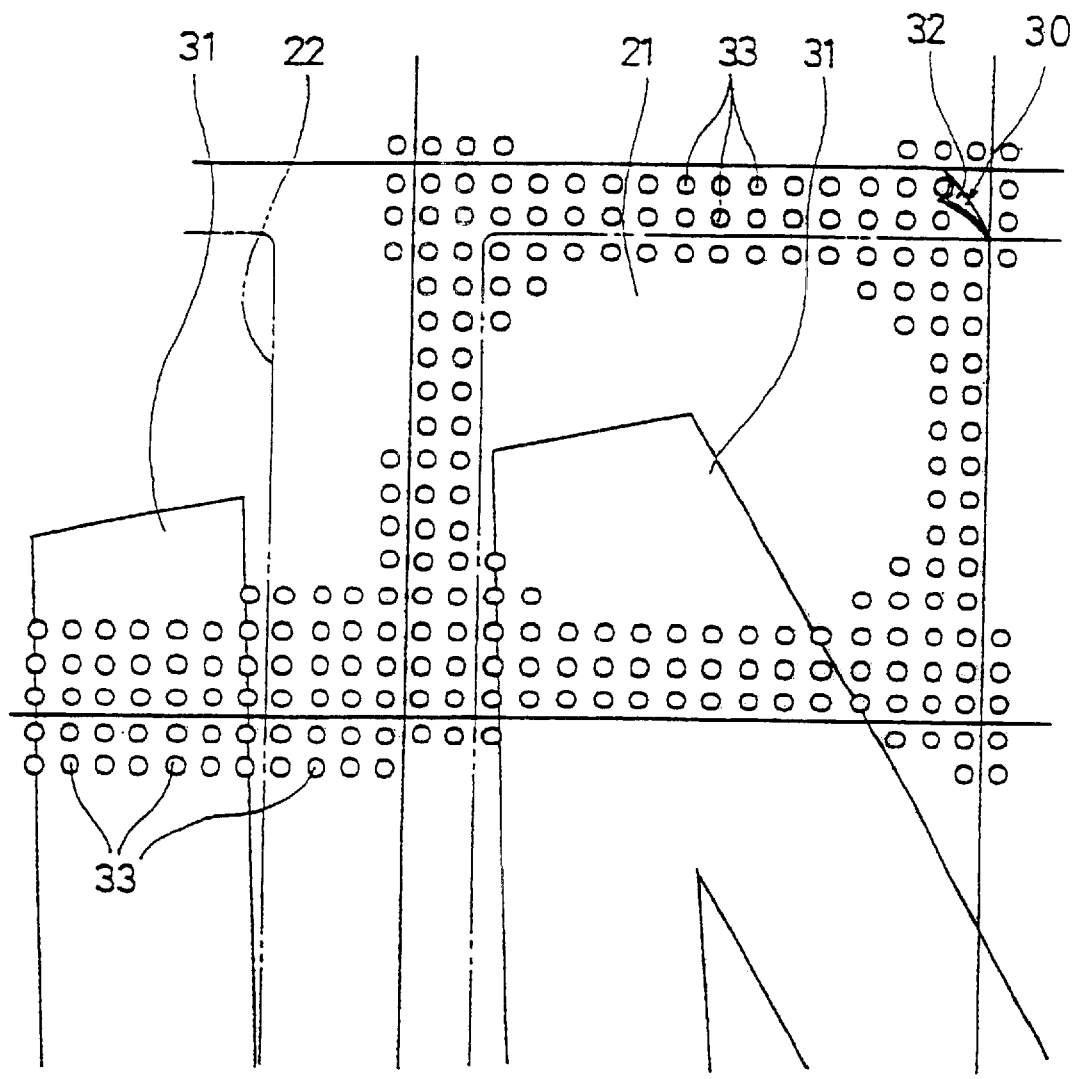
FIG. 3 is a side view enlarging a main portion of FIG. 2

FIGS. 1(a) and (b) are perspective views each showing an example in which the composition for molding a biodegradable plastic of the present invention is used to form a passport cover, which is a cover product. FIG. 2 is a perspective view showing an example in which the composition for molding a biodegradable plastic of the present invention is formed into a sheet, which is adhered onto a mobile vehicle as an advertisement display body. FIG. 3 is a side view enlarging a main portion of FIG. 2.

In one suitable example, it is advantageous that biodegradable components (A) and (B) are mixed in the proportion mentioned above. Pellets from which each of the biodegradable components has been formed separately in previous may be mixed to be used as these biodegradable components. Also, the powdery biodegradable components (A) and (B) according to the present invention can be mixed to be ready for use as these biodegradable components Furthermore, the biodegradable components (A) and (B) are mixed in a given proportion to produce a unified pellet, which can be used as the biodegradable components.

Each of these biodegradable components is incorporated into an extruder of an inflation film forming insulation, and processed at a temperature of 140° C. and at a feeding rate of 200 revolution/minute. subsequently, an internal cylinder and a passage length of the inflation film forming installation are set so as that the thickness of the sheet formed is in the range of from 0.05 to 1 mm (in this case, the thickness is set at 2 mm), with setting the forming rate at a range of from 30 to 150 (in this case, from 50 to 70 m/m).

Under these conditions, the composition for molding a biodegradable plastic could be formed into a 0.2 mm thick biodegradable plastic sheet If the thickness of the biodegradable plastic sheet is less than.0.05 mm, the strength and processability are impaired when a covering sheet is formed. Conversely, if it is more than 1 mm, the transparency, flexibility or processability of the resultant product is decreased. The biodegradable sheet with 0.2 mm in length thus formed has constant softness and, thus, excels in flexibility and returnability even if it bends The sheet is difficult to crease. Consequently, if one wants to carry out embossing or stamping, the sheet can be processed in a suitable manner.

The biodegradable plastic sheet was cut and fused to form a passport cover 1, for example, as shown in FIG. 1(a)

Figure 1B:
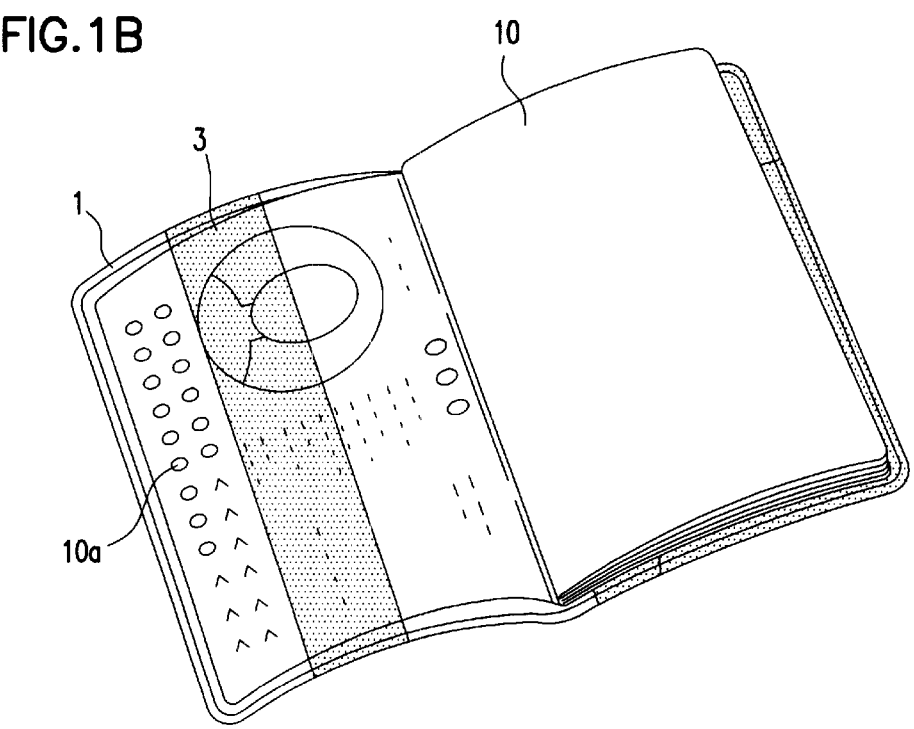

A band 3 of a passport cover 1 is adhered on the back surface of the front cover, and a first pocket 4 and a second pocket 5 provided so as to overlap to the first pocket 4 were adhered on the back surface of the back cover. Lower and upper positions 3a and 3b of the band 3 were adhered on the main body 2, all sides 4a, 4b, and 4c of the circumference edge position in the first pocket 4 are adhered onto the main body 2, and two sides 5a and 5b of the circumference edge were adhered onto the main body 2. Due to the excellent processability of the biodegradable plastic, adhesion and fusion operation utilizing thermal fusion, ultrasonic fusion, and with an adhesive can be carried out easily without fail. In this case, the ultrasonic fusion can be particularly used. As shown in FIG. 1(b), when a passport 10 is inserted in the passport cover 1, the passport 10 can be read out through a reading identification mechanism 10a of the passport 10 as is, because becomes possible by read out apparatus because of the formation of the band 3 at the position apart from the end portion.

In the case where a cover product, such as a file case, a notebook cover, a pass cover, an insurance policy cover or a card cover, is produced in two or more steps including cutting and conjugation, the use of the biodegradable plastic containing the above-mentioned proportion of the components is suitable in terms of excelling in tensile strength, weather resistance, water resistance, and processability. Particularly, the biodegradable plastic of the present invention is advantageously used in the formation of a mark, for example, on the front surface of the passport cover 1.

As shown in FIGS. 2 and 3, it may be constituted so as to form an advertisement display body 30 provided on a mobile vehicle body 20 of a bus etc. with biodegradable plastic. A plurality of through holes 33 are formed at constant interval on the whole surface of the advertise display body 30, an adhesive layer 32 is provided on one surface thereof, and an advertise display portion 31 with printing etc. is provided on the other surface. The advertisement display body 30 is constituted so as to be fit on the whole surface except for the windshield of mobile vehicle body 20. The advertisement display body 30 is constituted so as to be fit over a window 21 and a sash 22 (vehicle body).

Although thermal expansion due to heat occurs by the affect of sunbeams etc. when the vehicle runs with fitting the advertisement display body 30 to the mobile body, the expansion is advantageously absorbed through the through holes formed. It is possible to cope for wind pressure since there is no joint of the advertisement display body 30 in the concave and convex position of the vehicle body by fitting the advertisement display body 30 over the window 21 to the vehicle body (the sash 22 is included).

The biodegradable plastic is used which has a thickness of in the range of from 0.05 to 1 mm, being enough for withstanding to use with being fit to the mobile vehicle such as tensile strength, permeability during the course of printing, water resistance and weather resistance, even if the through holes 33 are formed.

In fitting the advisement display body 30, the advertisement display body 30 may be constituted so as to be fitted to the window and the vehicle body of the mobile vehicle divisionally. It is not necessary to provide any through hole on the advertisement display body at the portion to be fit on vehicle body side The advertisement display body 30 may be adhered not on the whole but on a part or parts of the advertisement display body 30 of the mobile vehicle. Further, in addition to the mobile vehicle, the advisement display body 30 may also be used for window an aperture of building.

Another embodiment of the present invention in which the biodegradable sheet using composition for molding biodegradable plastic will be described by referring to FIG. 4.

According to the embodiment shown in FIG. 4, the biodegradable plastic sheet can be used as tag for label.

As shown in FIGS. 4(a) and 4(b), the tag 40 has a display portion 42 showing the user's information such as name, an interposition portion 41 of a belt continued in one end of the display portion 42, a slide coming out portion 43 having a consecutive hole 45 formed in one end of the interposition portion, and a notch line 44 formed from the interposition portion 41 to a consecutive hole 45 by a predetermined length. A sword hole 46 is formed at the end of the notch line 44 and constituted so as not to be torn in a single cylinder by a notch line 44 adding force to other end.

As shown in FIG. 4(b), in using the tag 40, the interposition portion 41 is arranged along a handle of bag etc. (not shown), and the display portion 42 is passed into the notch line 44 so as to wind around the handle.

As shown in FIG. 4(b), a loop is formed in the interposition portion 41 to be mounted on the handle In this case, the loop is arranged so as to completely put to consecutive hole 45 of interposition portion.

By constituting the tag as described above, the tag 60 of this embodiment does not hang down completely due to the elasticity of plastic as compared to the conventional tag using a strand. Accordingly, the tag does not run out by the bombardment when a plurality of bags are lined up.

The products formed from the biodegradable plastic, such as cover product, including the passport cover 1, and the advertisement display body 30 are biodegraded into water and carbon dioxide, when they leave under the atmosphere where many bacteria are propagated, for example, in earth etc. after the use period is expired and they are disposed, leading to the advantage from the viewpoint of the disposal of the wastes.

While the embodiment where the inflation film-forming installation is used in the formation of the sheet having a thickness of from 0.05 to 1 mm, due to the excellent processability of the composition for molding a biodegradable plastic according to the present invention, such a sheet can be produced using a calendaring apparatus or an extrusion mechanism such as the T-die It is of course possible to form a cover product utilizing the biodegradable sheets differing in the thickness.

EXAMPLE

The present invention will now be described in more detail on the basis of the examples. However, the present invention is not restricted to these examples.

Examples 1 to 3 and Comparative Examples 1 to 3

As biodegradable component (A) comprising the aliphatic polyester as a main ingredient, Bionolle #3003 available from from Showa Kobunshi was used, and mater-bi F03U/A (starch content: approximately 50) available from Nippon Gosei Kagaku Kabushiki Kaisha was used as biodegradable component (B) comprising the starch material containing the destructured starch. They are formulated in the proportion shown in Table 1 to give inventive compositions and comparative composition for molding a biodegradable plastic.

TABLE 1

Formulation of Biodegradable Components

|  | Ex. 1 | Ex. 2 | Ex. 3 | Comp. Ex. 1 | Comp. Ex. 2 | Comp. Ex. 3 |
|---|---|---|---|---|---|---|
| Component (A) | 90 | 80 | 50 | 0 | 20 | 100 |
| Component (b) | 10 | 20 | 50 | 100 | 80 | 0 |

Subsequently, they were processed using a calendaring apparatus whose temperature was set at 120–135° C. to give a 0.01 mm thick sheet.

These products were tested for the items shown in Table 2.

The results are shown in Table 2.

TABLE 2

Processability and Physical Properties of Film

|  | Examples | | | Comparative exam | | | |
|---|---|---|---|---|---|---|---|
| Evaluated Items | 1 | 2 | 3 | 1 | 2 | 3 | Test method |
| Processabi |  |  |  |  |  |  |  |
| Bank condition | ○ | ⊚ | ○ | x | x | Δ | Processing test by |
| Surface state | ○ | ⊚ | ○ | x | x | Δ | calender roll |
| Roll lubrication | ○ | ⊚ | ○ | x | x | x | Evaluated with necked |
| Film | ○ | ⊚ | ○ | x | x | x | eyes |
| Secondary Processabil |  |  |  |  |  |  |  |
| Heat sealing | ○ | ○ | ○ | — | — | — |  |
| Embossment | ⊚ | ○ | ○ | — | — | — |  |
| Cutting | ○ | ○ | ○ | — | — | — |  |
| Physical Properties |  |  |  |  |  |  |  |
| Bending repulsion (mg) |  |  |  |  |  |  |  |
| Lengthwise | 490 | 520 | 830 | — | — | — | According to JIS L1096 |
| Crosswise | 500 | 530 | 780 | — | — | — | (gare method) |
| Tensile strength (kgf/mm$^2$) |  |  |  |  |  |  |  |
| Lengthwise | 4 | 3.8 | 2.3 | — | — | — | According to JIS K6301 |
| Crosswise | 4 | 3.5 | 1.7 | — | — | — | (2 dumbbell) (200 mm/min) |
| Breaking elongation (%) |  |  |  |  |  |  |  |
| Lengthwise | 810 | 750 | 620 | — | — | — |  |
| Crosswise | 820 | 720 | 400 | — | — | — |  |
| Tear strength (gf) |  |  |  |  |  |  |  |
| Lengthwise | 520 | 650 | 1040 | — | — | — | JIS P8116 |
| Crosswise | 550 | 740 | 840 | — | — | — | (pendulum method) |
| Total assessment | ○ | ⊚ | ○ | x | x | x |  |

From the results of Table 2, it has been proven that the inventive molding compositions excel in the processability, the secondary processability, and the physical properties of the sheets obtained therefrom. Also, these results show that various films varying the rigidity of the film, i.e., from a soft film to a comparatively rigid film, can be produced by varying the proportion of biodegradable component (A) to biodegradable component (B).

Example 2 and Comparative Examples 1 and 3

The melt-viscosity characteristics of the inventive composition (Example 2) comprising 80% by weight of Bionolle #3003 available from from Showa Kobunshi as biodegradable component (A) and 20% by weight of mater-bi F03U/A (starch content on the weight base: approximately 50%) available from Nippon Gosei Kagaku Kabushiki Kaisha as biodegradable component (B), the composition consisting essentially of Bionolle #3003 (Comparative Example 3), and the composition consisting essentially of mater-bi F03U/A were examined at a temperature range of from 80 to 160° C.

The results are shown in FIG. 5.

As shown in FIG. 5, the composition of Example 2 is proven to have a lower melt-viscosity in comparison with the composition of Comparative Example 3 where composition (A) was used alone and the composition of Comparative Example 1 where composition (B) was used alone. The composition of Example 4 is also proven to have a smoother melt-viscosity curve in comparison with that of Comparative Example 1. From these results, the molding composition of the present invention is proven to excel in the processability.

INDUSTRIAL APPLICABILITY

The present invention constructed described above exhibits the following outstanding advantages:

According to the molding composition according to the present invention, which is obtained by mixing a biodegradable component comprising an aliphatic polyester as a main ingredient with a biodegradable component comprising a starch material as a main ingredient in an appropriate proportion, secondary process such as cutting and adhesion can be carried out. Also, the molding composition can be molded into a biodegradable sheet having a desired rigidity from one which excels in flexibility to one which has relatively high rigidity to meet the object. Particularly, the molding composition of the present invention can be formed into a product in a sheet from having a thickness of from 0.05 to 1 mm and excelling in flexibility, which cannot be produced with any of the conventional compositions. The sheet obtained therefrom is then formed into a cover product, which has a prescribed thickness and can be subjected to two or more steps, inclusive of a passport cover, a name card holder, and a document holder. What is more, of the product is discarded after use, the product is biodegraded through bacteria with elapse of the time into water and carbon dioxide. Accordingly, excellent products in terms of environmental hygienic can be provided Furthermore, the biodegradable molding composition can be formed into a sheet, an adhesive layer can be provided on one surface, an advertisement display portion can be provided on the other surface, and through holes are perforated over the whole surface to construct an advertisement display body 5. The adhesive layer of the advertisement display body may be adhered on a mobile vehicle having windows. When the advertisement display body is discarded after use, it exhibits excellent characteristics from the environmental hygienic viewpoint.

What is claimed is:

1. A composition for molding a biodegradable plastic comprising:

A) biodegradable component comprising an aliphatic polyester as a main ingredient; and B) a biodegradable component comprising from 45 to 55% by weight of starch material containing a destructured starch, from 12 to 15% by weight of a plasticizer having a high boiling point as an additive and from 1 to 3% by weight of a stabilizer as an additive and the rest of ethylene-vinylalcohol copolymer wherein the content of biodegradable component (B) is from 5 to 55 by weight based on 100 parts by weight of biodegradable component (A).

2. The composition for molding a biodegradable plastic as claimed in claim 1 wherein said biodegradable component (A) is preferably an aliphatic polyester represented by the formula:

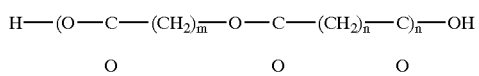

3. The composition for molding a biodegradable plastic as claimed in claim 1, which contains a biodegradable pigment as an additive.

4. A biodegradable plastic molded product obtained by molding the composition for molding a biodegradable plastic as claimed in claim 1.

5. A biodegradable plastic sheet obtained by forming the composition for molding a biodegradable plastic as claimed in claim 1 in a sheet from.

6. The biodegradable plastic sheet as claimed in claim 5, which has a thickness of from 0.05 to 1 mm.

7. The biodegradable plastic sheet as claimed in claim 5, which is be formed into a cover product through second or multi-step forming including cutting and conjunction step.

8. The biodegradable plastic sheet as claimed in claim 7, which is configured to be an advertisement display body by providing an adhesive layer on one layer, providing an advertisement display portion on another layer, and having through holes provided on the whole surface of the sheet.

9. The biodegradable plastic sheet as claimed in claim 8, wherein said advertisement display body is adhered on a mobile vehicle having windows at the adhesive layer side.

10. The biodegradable plastic sheet as claimed in claim 7, wherein said biodegradable sheet has a display portion and a sliding portion at one end and the other end of band shaped interposition portion, continuously provides with a cut ship from the interposition portion to the pass portion, and is a tag to which a pass hole to pass through the interposition portion is formed in pass portion.

11. The composition for molding a biodegradable plastic as claimed in claim 1, wherein the content of said biodegradable component as starch material (B) is 15 to 30 parts by weight based on 100 parts by weight of said biodegradable component as an aliphatic polyester (A).

12. A composition for molding a biodegradable plastic according to claim 1 wherein the biodegradable plastic is a non-rigid sheet.

13. A method of producing a biodegradable non-rigid sheet comprising the step of forming a composition according to claim 1 into a non-rigid sheet by a calendar method at a melting temperature for the biodegradable plastic of 110° C. to 1500° C.

* * * * *